Feb. 12, 1929.
A. MILLER
WEATHER STRIP
Filed April 3, 1928
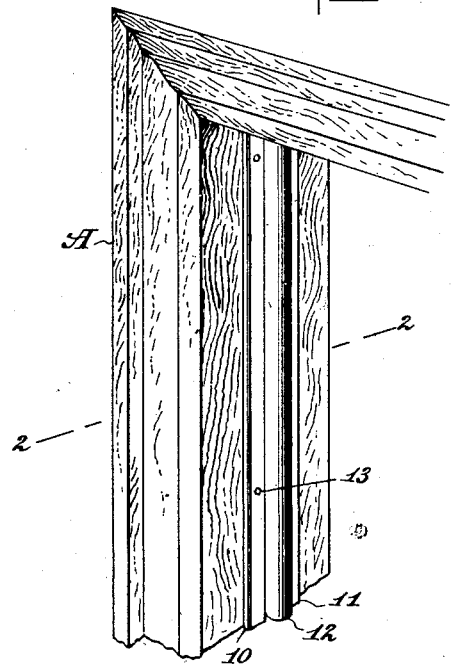
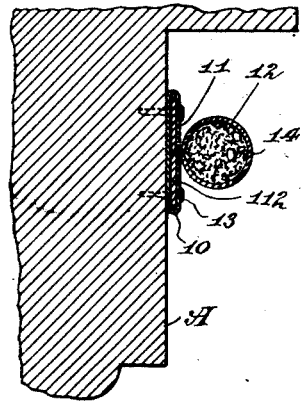
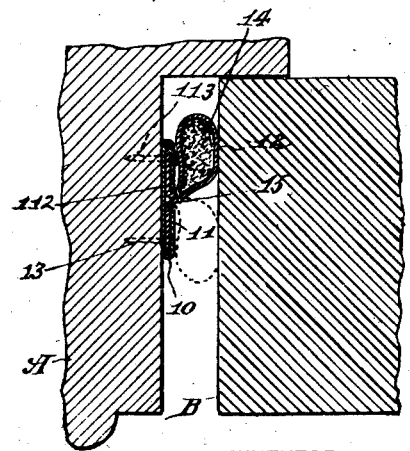
WITNESSES
INVENTOR
Augustus Miller
BY
ATTORNEY Patented Feb. 12, 1929.

1,702,217

UNITED STATES PATENT OFFICE.

AUGUSTUS MILLER, OF EAST ORANGE, NEW JERSEY.

WEATHER STRIP.

Application filed April 3, 1928. Serial No. 267,104.

My invention relates to a weather strip, and more particularly has in view to produce a weather strip especially adapted for application to a door frame to be engaged by the opposed edge surface of the door.

A particular object of the present invention is to provide a weather strip including a base and a flexible element, the base being so formed and so related to the flexible element that the door will engage the flexible element of the weather strip in a manner to promote weathering conditions, and will cause said element to be flexed and deformed, first in one direction by the closing of the door, and then in the reverse direction by the opening of the door, whereby to restore the flexible element to its normal form and prevent permanent flattening or like deformation of the strip.

The nature of my invention and its distinguishing features and advantages will clearly appear as the description proceeds.

Reference is to be had to the accompanying drawings forming part of this specification, it being understood that the drawings are merely illustrative of one example of the invention Figure 1 is a perspective view of a portion of a door frame having a weather strip formed in accordance with my present invention applied to the door frame;

Figure 2 is a cross section on the line 2—2 of Figure 1, showing the weather strip in normal form in the absence of contact with the door edge;

Figure 3 is a view similar to Figure 2 but indicating conventionally a fragment of a door in engagement with a weather strip and deforming the same in a manner due to the closing of the door; the dotted lines in Figure 3 representing the movement of the flexible element of the weather strip in the reverse direction due to the opening of the door.

In carrying out my invention in practice I provide a base of sheet metal designated generally by the numeral 10. The material of said base 10 is folded over inwardly, the side edges being directed toward each other leaving a slight space therebetween. Between the back of the base 10 and the inturned edges 11 thereof there is clamped the edges of a flexible strip 12, said edges being designated 112. Suitable fasteners, such as tacks 13, are provided and driven through the inturned edges of the base 10, through the outwardly directed edges 112 of the strip 12, and through the back of the base 10 into the door frame.

Within the strip 12 of flexible material is enfolded a core 14 normally round in practice, as shown in Figure 2. A row of stitching 15 is run transversely through the strip 12 in a manner to tightly enfold the core 14, and said stitching lies close to the base so that there is no shank provided between the base 10 and the flexible weather strip proper.

The arrangement is such that the contact portion of the weather strip lies in close relation to the metal base clamping the edges 112 of strip 12. The result is that when the door B is closed, as in Figure 3, it engages the weather strip and deforms the same from the round form to a more or less flattened form. The strip is essentially round, as will be seen in its normal position, and it tends to roll against the inturned edges of the base 10 and is pressed tightly against the base by the door edge.

In Figure 3 it will be seen from the full lines that the weather strip is moved away from its normal position in one direction to be disposed at one side of the space between the edges 11. The dotted lines indicate that when the door is open the reverse movement is given to the weather strip owing to frictional engagement of the door, and the strip is moved in the opposite direction to the opposite side of the space between the edges 11. In this way the strip is moved and deformed first in one direction and then moved in the opposite direction by the opening of the door so that the strip is restored from the first position and maintains its normal more or less round form, so that in contact with the door by successive closing and opening of the door it maintains its original form.

I claim:

A weather strip comprising a base of sheet metal, having a back member and inturned edge portions presenting a space therebetween, and a weathering strip formed of an outer strip of flexible material, and a core enfolded by said strip of flexible material, means holding said flexible strip wrapped about said core in tight relation, said means being close to the base so that the flexible strip projects directly from a plane adjacent to the base, the strip being flexible in both directions to be pressed against the base alternately at each side of the space between the inturned edge portions of the base to be deformed in opposite directions by the closing and opening of the door when the weather strip is secured to a door frame.

Signed at New York, in the county of New York and State of New York, this 2nd day of April 1928.

AUGUSTUS MILLER.